US008303707B2

(12) United States Patent
Rice et al.

(10) Patent No.: US 8,303,707 B2
(45) Date of Patent: Nov. 6, 2012

(54) RESTRAINING EXPANSIVE CONCRETE WITH NON-METALLIC FIBERS

(75) Inventors: Edward K. Rice, Los Angeles, CA (US); Eric Bescher, Los Angeles, CA (US); David Flax, Laguna Niguel, CA (US); Daniel Goods, Livermore, CA (US); Kyle de Bruyn, Anaheim, CA (US)

(73) Assignee: PKL Corporation, Los Angeles, CA (US)

( * ) Notice: Subject to any disclaimer, the term of this patent is extended or adjusted under 35 U.S.C. 154(b) by 0 days.

(21) Appl. No.: 13/173,092

(22) Filed: Jun. 30, 2011

(65) Prior Publication Data

US 2011/0253013 A1    Oct. 20, 2011

Related U.S. Application Data

(63) Continuation of application No. 11/673,391, filed on Feb. 9, 2007, now Pat. No. 7,988,782, which is a continuation of application No. 11/077,610, filed on Mar. 11, 2005, now abandoned.

(51) Int. Cl.
*C04B 14/38* (2006.01)
(52) U.S. Cl. ........................................ 106/644; 106/713
(58) Field of Classification Search .................. 106/644, 106/713, 724
See application file for complete search history.

(56) References Cited

U.S. PATENT DOCUMENTS

| | | | |
|---|---|---|---|
| 3,251,701 A | 5/1966 | Klein et al. | |
| 4,419,136 A | 12/1983 | Rice | |
| 4,968,561 A * | 11/1990 | Mizobe et al. | 428/397 |
| 5,846,316 A | 12/1998 | Rice | |
| 6,933,038 B2 * | 8/2005 | Nanko et al. | 428/191 |
| 6,969,423 B2 * | 11/2005 | Li et al. | 106/672 |

OTHER PUBLICATIONS

ASTM Intl., "Standard Specification for Fiber-Reinforced Concrete and Shotcrete," Designation C 116-03 (Sep. 2003).
Grace Construction Products, "Grace MicroFiber™ Synthetic Fiber for Concrete," data sheet (2004).
Forta Corporation, "Econo-Mono® Fact-Data," product information (undated).
Kuraray America Inc., "Kuraray PVA fiber for Cement, Mortar and Concrete," Usage Guide (Nov. 2003).
Rice, E., et al., "Bonding of Fibrillated Polypropylene Fibers to Cementitious Materials," Mat. Res. Soc. Symp. Proc. 114:145-152 (1988).
Si Concrete Systems, "Fibermesh® 150 Product Data Sheet" (Jan. 2003).

* cited by examiner

*Primary Examiner* — Paul Marcantoni
(74) *Attorney, Agent, or Firm* — Perkins Coie LLP

(57) ABSTRACT

Synthetic fibers, such as polypropylene fibers, are mixed in a shrinkage compensating concrete to provide restraint in lieu of conventional steel reinforcement used in a shrinkage compensating concrete. While the synthetic fibers have a low elastic modulus and low strength, they act to restrain expansion of the concrete in the same way that conventional steel rebar does. In addition, only a small amount of the synthetic fibers are needed to restrain the expansion. As a result, shrinkage compensating concrete can be used in more varied applications, and can be provided more quickly, easily and inexpensively. Construction time requirements and expenses of concrete structures are correspondingly reduced.

9 Claims, 4 Drawing Sheets

RESTRAINING EXPANSIVE CONCRETE WITH NON-METALLIC FIBERS

This application is a Continuation of U.S. patent application Ser. No. 11/673,391 filed Feb. 9, 2007, now pending, which is a Continuation of U.S. patent application Ser. No. 11/077,610 filed. Mar. 11, 2005, and now abandoned.

The field of the invention is shrinkage compensating concrete.

As is well known, concrete tends to shrink as it dries or cures. This shrinkage occurs with loss of water as the concrete dries. When the concrete is restrained from freely shrinking, as it usually is, the drying shrinkage creates tensile stresses in the concrete. Since concrete generally has low tensile strength, stresses from shrinkage often cause cracking.

To better avoid or reduce cracking caused by shrinkage, various expansive concretes have been used. See for example Klein, U.S. Pat. No. 3,251,701, Rice, U.S. Pat. No. 4,419,136, and Rice U.S. Pat. No. 5,846,316, each incorporated herein by reference. These and other shrinkage compensating concretes include an expansive cement. Expansive cement generally is a Portland cement that includes an expansive material. The expansive cement causes the concrete to expand slightly, which helps to offset or compensate for the shrinkage associated with drying. As a result, shrinkage and resulting tensile stresses in the concrete are reduced or eliminated, along with the cracking resulting from those stresses. Since the tensile strength of concrete increases over time, use of an expansive cement can also help reduce shrinkage cracking by reducing the tensile stresses, until the concrete acquires sufficient tensile strength to better withstand the tensile stresses without cracking. Shrinkage compensating concrete has been successfully used since the mid-1960's in many structures, including highways, airport runways, bridge decks, hydraulic structures, wastewater treatment plants, post-tensioned structures, roofs and slabs-on-grade.

The expansion of the shrinkage compensating concrete must be restrained to place the concrete in compression. Usually the concrete is restrained by steel rods, bars or mesh embedded into the shrinkage compensating concrete to restrain the expansion. Some structures require steel reinforcement for structural requirements. For these types of structures, the need for steel reinforcement to restrain expansion may not be a significant disadvantage. However, for many other structures, such as pavement or slabs-on-grade, adding steel for the sole purpose of restraining expansion significantly increases the time and expense required to complete the structure, compared to conventional non-reinforced concrete.

Another disadvantage of using steel reinforcement to restrain expansion of shrinkage compensating concrete is that the presence of the steel can interfere with automated leveling or screeding of the concrete. Especially with larger areas, the concrete is often leveled or screeded using an automated self-propelled screed machine. These machines, which typically level the concrete using a screed head or blade guided by lasers, have a boom length or reach of about up to 6 meters. For structures wider than about 6 meters, the screed machine must make multiple passes. Since the wheels of the screed machine cannot easily pass over the steel reinforcement rods, bars or mesh, alternative techniques must be used, adding to the time and cost of completing the structure.

To try to overcome these disadvantages, steel fibers have been used as a restraining material or element, in place of steel bars, rods or mesh, in shrinkage compensating concrete. Steel fibers can effectively provide restraint against expansion, and can be easier and less expensive to use than bars. It has generally been assumed that steel fibers can work to restrain expansion of concrete because a mixture of concrete paste with high modulus steel fiber reinforcement forms a composite having a higher elastic modulus than the paste alone. As a consequence, the concrete members or structures including steel fibers may be properly restrained for shrinkage compensation.

Steel fibers, however, have certain disadvantages. One disadvantage is that some steel fibers may protrude from the concrete structure, or may otherwise remain uncovered by the concrete. These steel fibers then almost inevitably rust, resulting in surface staining and or deterioration of the concrete surface. To avoid rusting, use of coated fibers or stainless steel fibers has been proposed. However, coated fibers have generally not been successful, because the coating wears off or is abraded during dispersing and mixing of the fibers into the concrete. Stainless steel fibers have not found widespread use because of the high cost of stainless steel. The steel fibers must also be reasonably well distributed within the concrete. While steel fibers are less expensive than steel rods, bars or mesh, using steel fibers adds significantly to construction costs.

Accordingly, there is a need for an improved shrinkage compensating concrete that can be used without conventional steel bar, rod, mesh or steel fibers for restraining the concrete.

SUMMARY

A novel shrinkage compensating concrete includes low elastic modulus fibers, such as polymer fibers, that provide restraint against expansion comparable to metal reinforcement. Glass, ceramic, and similar fiber materials may be used. The shrinkage compensating concrete having these fibers does not require steel reinforcement for restraint against expansion. As a result, concrete structures can now be made with shrinkage compensating concrete, to reduce or avoid cracking, without the need for steel reinforcement. Construction costs and time requirements are correspondingly reduced. Although the use of fibers in cement is known (see for example E. K. Rice, G. L. Vondran and H. Kunbargi, Mat. Res. Soc. Symp. Proc., Vol. 114, 1988, 145-150), the restraint characteristics of the present concrete have not been previously achieved.

In another aspect, the weight of fibers used in the present shrinkage compensating concrete is much lower than in steel fiber reinforced concrete. Steel fiber reinforced concrete generally requires about 41 pounds of fibers per cubic yard of concrete. When polymer fibers are used, such as polypropylene or poly vinyl alcohol fibers, the weight of the fibers needed to provide equivalent restraint is only about 1-10%, 2-8%, or 3-7% of the weight of steel fibers. The concrete may include 1-10 pounds of fibers per cubic yard.

Shrinkage compensating mortars may similarly be restrained using low elastic modulus material, such as polymer fibers.

Other and further objects and advantages will become apparent from the following detailed description, to persons skilled in the art. The invention resides as well in sub-combinations of the features and elements described.

Figure 1:
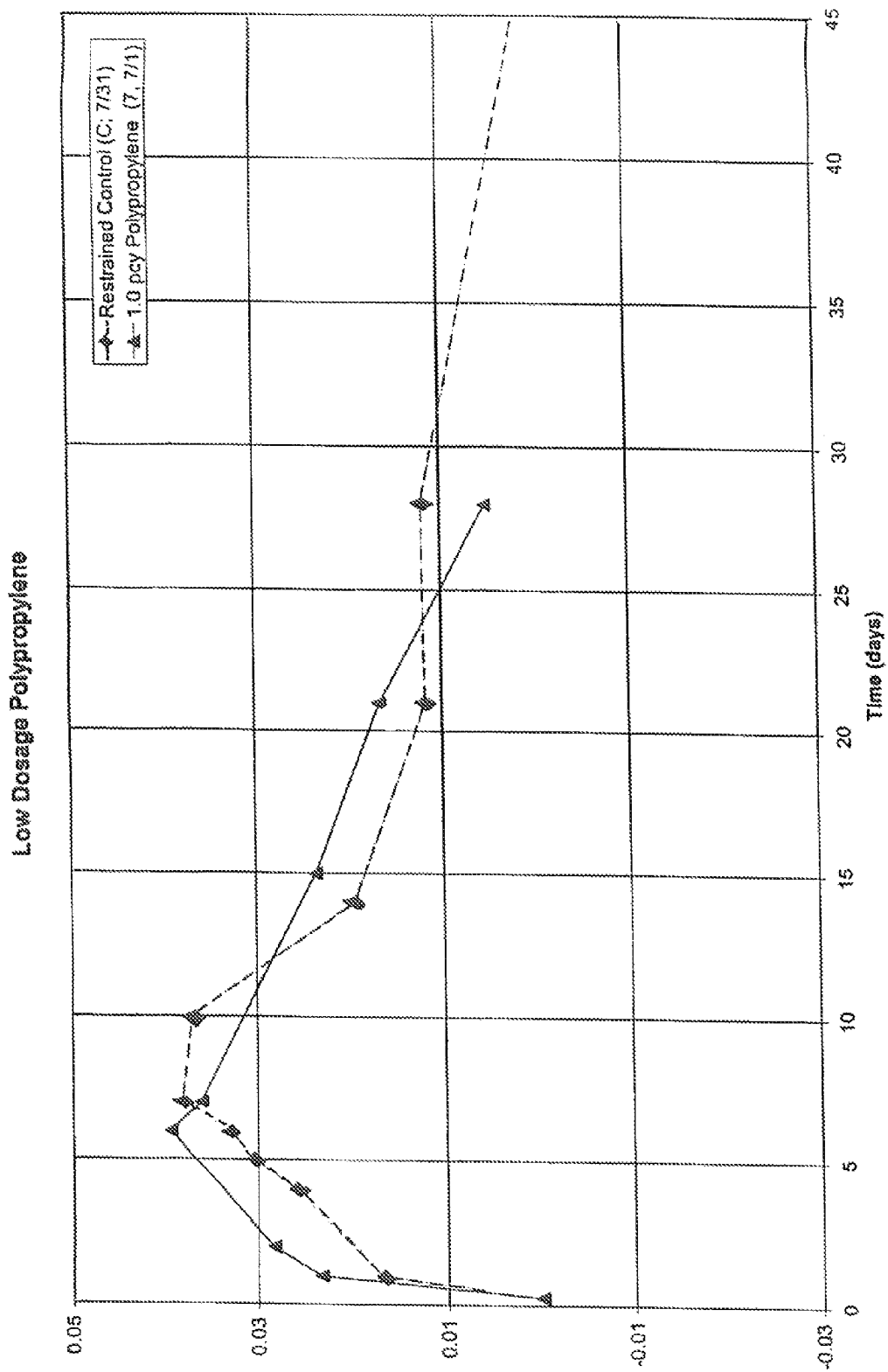
FIG. 1 is a graph showing the restraint provided by polypropylene fibers in comparison to a standard restrained ASTM 878 test bar, using a steel rod for restraint, as described in Example I below.

DEFINITIONS cement: any substance provided (at least at one time in the manufacturing process) in a powdered or granular form, that when mixed with a suitable amount of water, can form a paste that can be poured or molded to set as a solid mass.

expansive cement: a cement that when mixed with water forms a paste that, after setting, tends to increase in volume to significantly greater degree than portland cement paste. ACI 223-98.

fiber: slender or elongated filaments in form of bundles, networks, or individual or groups of strands of any natural or manufactured material that can be distributed uniformly or non-uniformly throughout freshly mixed concrete. ASTM C 1116-03.

restraining material: a material provided in or on a concrete or mortar structure to restrain expansion of the structure during setting or curing of the concrete or mortar.

shrinkage compensating cement: an expansive cement so proportioned that when combined with suitable amounts of aggregate and water forms a shrinkage compensating concrete or mortar. ACI 223-98.

shrinkage compensating concrete: The ASTM standard specification for expansive hydraulic cement (ASTM C 845) defines shrinkage compensating concrete as a concrete made with an expansive cement in which the expansion, if restrained, induces compressive stresses that approximately offset tensile stresses induced by drying shrinkage.

tensile strength of a fiber: tensile strength as measured by ASTM C 1557-03.

Young's Modulus or elastic modulus of a fiber: Young's modulus as measured by ASTM C 1557-03.

DETAILED DESCRIPTION

The physical requirements in ASTM C 845 as to restraint and compressive strength are:
Restrained Expansion of Mortar
7-day expansion:

| | |
|---|---|
| min, % | 0.04 |
| max, % | 0.10 |

Compressive Strength, Min

| | |
|---|---|
| 7-day, psi (MPa) | 2100 (14.7) |
| 28-day, psi (MPa) | 3500 (24.5) |

Several methods may be used to measure the expansive properties of concrete (See Rice, U.S. Pat. No. 3,779,085). The restrained expansion of mortar is generally measured using ASTM C 806: "Test Method for Restrained Expansion of Expansive Cement Mortar". The compressive strength of the expansive cement is measured using ASTM Test Method C 109/C109M, except that a water-cement ratio of 0.50 shall be used, the specimens shall be covered with a polyethylene sheet or other suitable material for preventing loss or gain of moisture at the surface of the specimens during the moist storage period in the molds, and the specimens shall remain in the molds for 3 days.

The scope of ASTM C 806 covers the determination of length changes of expansive mortar, while under restraint, due to the development of internal forces resulting from hydration of the cement. The apparatus used is as follows:

Molds.

The molds for casting test specimens, when used in conjunction with the restraining cage described below, shall provide for forming either 2 by 2 by 10 in. prisms having a 10-in. gage length, or 50 by 50 by 250 mm prisms having a 250 mm gage length. The molds shall otherwise conform to the requirements of Practice C 490, except that the cage stud holder, gage stud and spacer screws described in that specification shall not be used.

Restraining Cage.

The cage consists of a threaded steel rod with steel end plates held in place by nuts. The rod shall be provided with cap nuts for the prevention of corrosion. The rod shall conform to specification A 307 grade A except it shall support 1180 lbf (5249N) proof load when tested in accordance with method 1 of test methods F 606. Specification A307 grade steel has a modulus of Elasticity of about $25 \times 10^6$ psi.

The method for measuring the restrained expansion in concrete is ASTM C 878 "Restrained Expansion of Shrinkage Compensating Concrete". The scope of ASTM C 878 covers the determination of the expansion of concrete made with shrinkage compensating cement. Its significance and use are as follows:

Since the potential for expansion, under conditions of controlled restraint, of concrete made with shrinkage compensating cement cannot always be satisfactorily predicted from tests of mortars made in accordance with Test Method C 806, a need has been recognized for a test method in which concrete specimens are tested. This test method can also be adapted readily to studies of expansion involving degrees of restraint, comparison of cements, effects of cement contents, aggregates, mixture proportions, schedules or environmental treatments that differ from the standards procedures prescribed by this test method.

The apparatus for the testing is as follows:

Molds for casting test specimens, when used in conjunction with the restraining cage described below, shall provide for forming prisms 76 mm (3 in.) square with a gage length of 250 mm (10 in.). The molds shall otherwise conform to the requirements of molds in Practice C 490, except that the stud holder, gage studs, and spacer screws described in that practice will not be used.

Restraining cage, consisting of a threaded low-carbon steel rod (plain or zinc-coated) with steel end-plates held in place by hex nuts. The hex nuts outside the cage shall be of stainless steel. Stainless steel cap nuts outside the cage shall be put on each end of the rod. When tested in tension, within the elastic range, the rod shall have a strain of 2800 kN (0.0012±0.00001/630 lbf] of load. It is intended that all rods used meet the indicated requirement for strain. When a large number of rods are obtained in a single lot, exercise judgment as to whether or not all must be tested. The designation "10-24" is used in ordinary rods having the desired properties.

The Young's modulus (or modulus of elasticity) for the restraining rod is about $25 \times 10^6$ psi. The cross-sectional area ratio of steel to concrete is about 0.0014.

Construction practice is to use an area of steel to concrete of about 0.0015 for restraint. This amount of reinforcing steel in a typical 8" thick slab on grade is a ½" dia. (#4 bar) 16" on center each way. This gives bi-axial restraint. This is about 43 pounds of steel per cubic yard of concrete. Steel fibers have also been used in shrinkage compensating concrete. Using steel fibers, which give tri-axial restraint, requires about 41 lbs of steel fibers per cubic yard of concrete, to give equivalent restraint of conventional reinforcement. However, since the location of the steel fibers cannot be controlled, some of the steel fibers can end up protruding out of the structure. These fibers can then rust, staining the concrete and/or causing surface deterioration. Stainless steel fibers have been used to prevent rusting, however they are very expensive.

In recent years, synthetic fibers have been developed for use in regular concrete. In comparison to steel, these synthetic fibers have a much lower modulus of elasticity about $0.1 \times 10^6$ to $0.3 \times 10^6$ psi. This is about 1% of modulus of elasticity of steel. These fibers also have a lower density than steel, i.e., a density of about 0.1 times that of steel. If synthetic fibers are substituted pound for pound for steel fibers, about 41 pounds of such fiber would be required.

However, in practice, the fiber loading limit for synthetic fibers of similar size and shape to steel fibers is about 20 pounds per cubic yard of concrete. If the fiber loading limit is exceeded, the fibers tend clump up or ball up, making it difficult or impossible to effectively finish or smooth out the concrete structure. With smaller fibers such as microfibers, the maximum practical dosage is only about 5 pounds per cubic yard (pcy) of concrete to prevent balling and clumping.

For use as a restraining material in shrinkage compensating concrete, synthetic or polymer fibers generally will have diameters of from about 0.01 to 1 mm (and typically about 0.01-0.3 mm), and have an average length of about 3 to 40 mm (and more typically about 5 to 15 mm). Fibers having a modulus of elasticity of from about $0.05 \times 10^6$ to about $0.10, 3, 6$ or $20 \times 10^6$ psi, may be used. The fibers may be polypropylene, poly vinyl alcohol, nylon or other polymeric material. Glass, basalt or other inorganic fibers may also be used. Fibers having a density of about 0.7 or 0.8 to about 0.2 or 3 g/cm3 may be used.

Tests were conducted to determine the effects of use of synthetic fibers in restraining expansion of shrinkage compensating concrete.

EXAMPLE I

Laboratory Testing

Specimens were prepared according to ASTM standard C 878. All specimens were poured in C 878 molds so as to contain ninety cubic inches of concrete and have the dimensions 3"×3"×10".

The fibers used had the following characteristics, as described by their vendors:

|  | Polypropylene | PVA |
| --- | --- | --- |
| Density (g · cm-3) | 0.91 | 1.3 |
| Tensile Strength | 90-110 ksi | 160 N/mm² |
| Modulus of elasticity | 500 ksi | 37 kN/mm² |

One half cubic foot batches of concrete were prepared. Each half cubic foot contained 9.63 pounds (520 pounds per cubic yard [pcy]) Portland cement and 1.67 pounds (90 pcy) of an expansive material (Komponent® manufactured by CTS Cement Company, Cypress, Calif.). Expansive materials are typically added to Portland cements in amount of 5-20. % according to requirements of the cement industry. After the Portland cement and expensive, material were mixed, 0.041 pounds of fibers were added and incorporated into the mixture, representing 2.2 pcy, 34.26 pounds (1850 pcy) ¾" stone and 22.91 pounds (1237 pcy) washed concrete sand (both at SSD) were added to a buttered mixer. Then, 6.72 pounds (363 pcy) water was added into the mixer, along with the cement mixture.

Each batch was mixed for 3 minutes, allowed to rest for 3 minutes, mixed for 2 more minutes, rested for 20 minutes and, finally, mixed for a final 2 minutes. Batches yielded enough concrete for six bars. Cylinders (4" by 8") were also cast from several batches and tested for compressive strength. The compressive strength of the cylinders was relatively equal for the different types of fibers in different quantities. Testing determined that there was no loss of strength due to the addition of fibers to the concrete.

Three or more bars were made from each batch of concrete. The bars followed the guidelines of C 878 with the following exception for fiber-reinforced samples: The #10-24 all-thread rod that normally restrains the expansion of a C 878 bar was not used. Instead, the two endplates were each connected to a shorter piece of all-thread so that 1" was protruding into the test bar to secure the endplates to the concrete with the acorn capped nut. For the restrained control samples, the rod was left in place.

Bars were cured for twenty four hours in a one hundred percent humidity environment before the molds were stripped. One half hour after the molds were stripped, the bars were measured for the initial length. For the initial reading, after the bars were measured they were wet cured for one week before being moved to a temperature-controlled room for the next 21 days. Typically concrete is wet-cured in the field for 7 days. The bars were measured daily during the first seven days and then weekly to 28 days. The compressive strength cylinders were stripped after 24 hours and wet cured for 28 days before being tested for compressive strength.

As data was collected, the elongation measurements were taken from each sample; the results were subtracted from the initial measurements and converted from elongation in inches into percent elongation. The graphs of FIGS. 1 and 2 were formed by taking the average elongation of the batch and plotting versus time.

Figure 2:
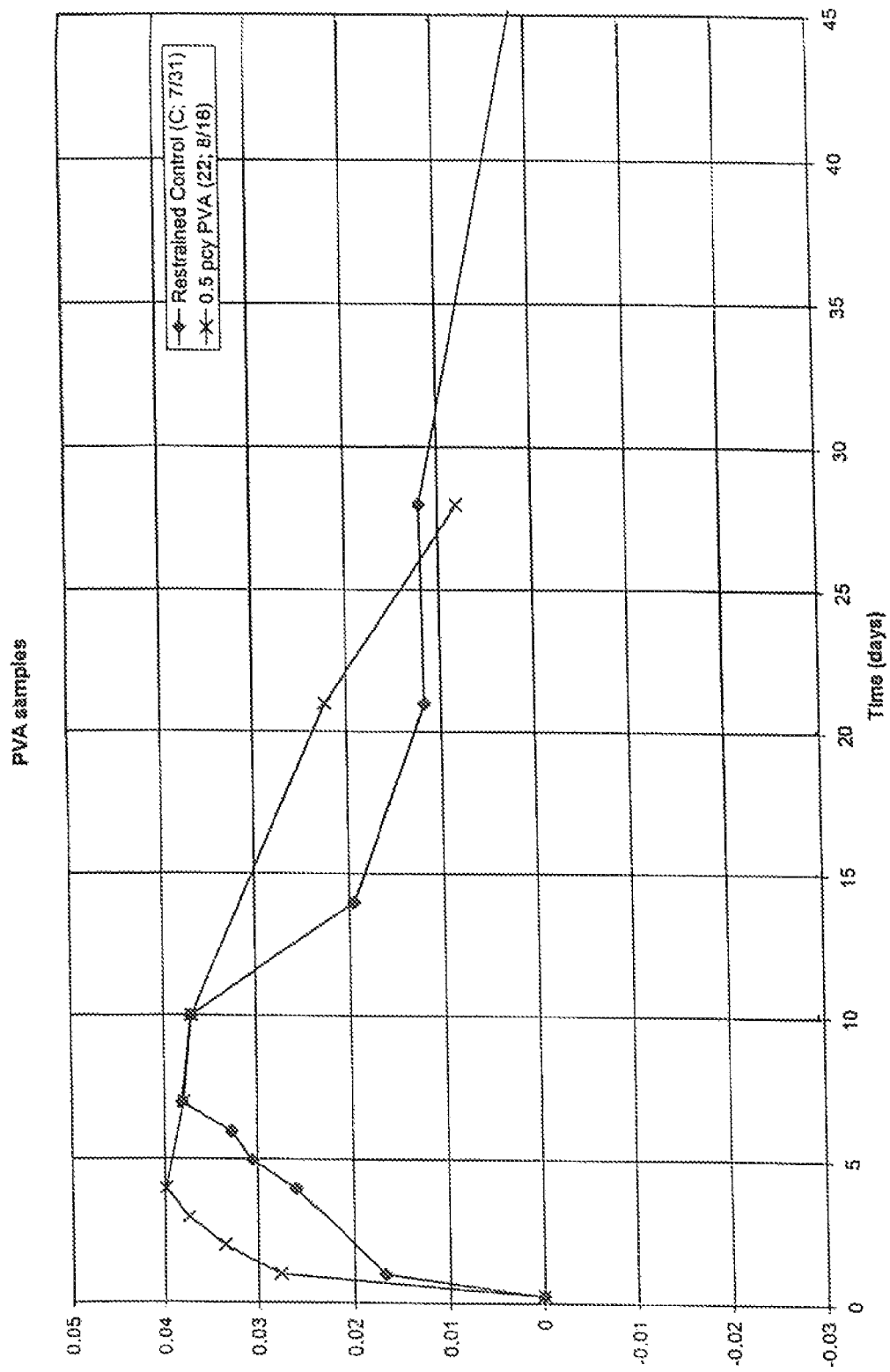
FIG. 2 is a graph showing the restraint provided by poly vinyl alcohol fibers in comparison to a standard ASTM 878 restrained test bar, also as described in Example I below.

FIGS. 1 and 2 show that the fibers provide restraint equal to or higher than the steel rebar. The fibers have a low elastic modulus. Therefore, the conventional approach of restraint against expansion caused by an increase in the modulus of the paste as a result of the presence of the high-modulus fiber, such as steel, is not applicable.

EXAMPLE II

Field Testing

Figure 3:
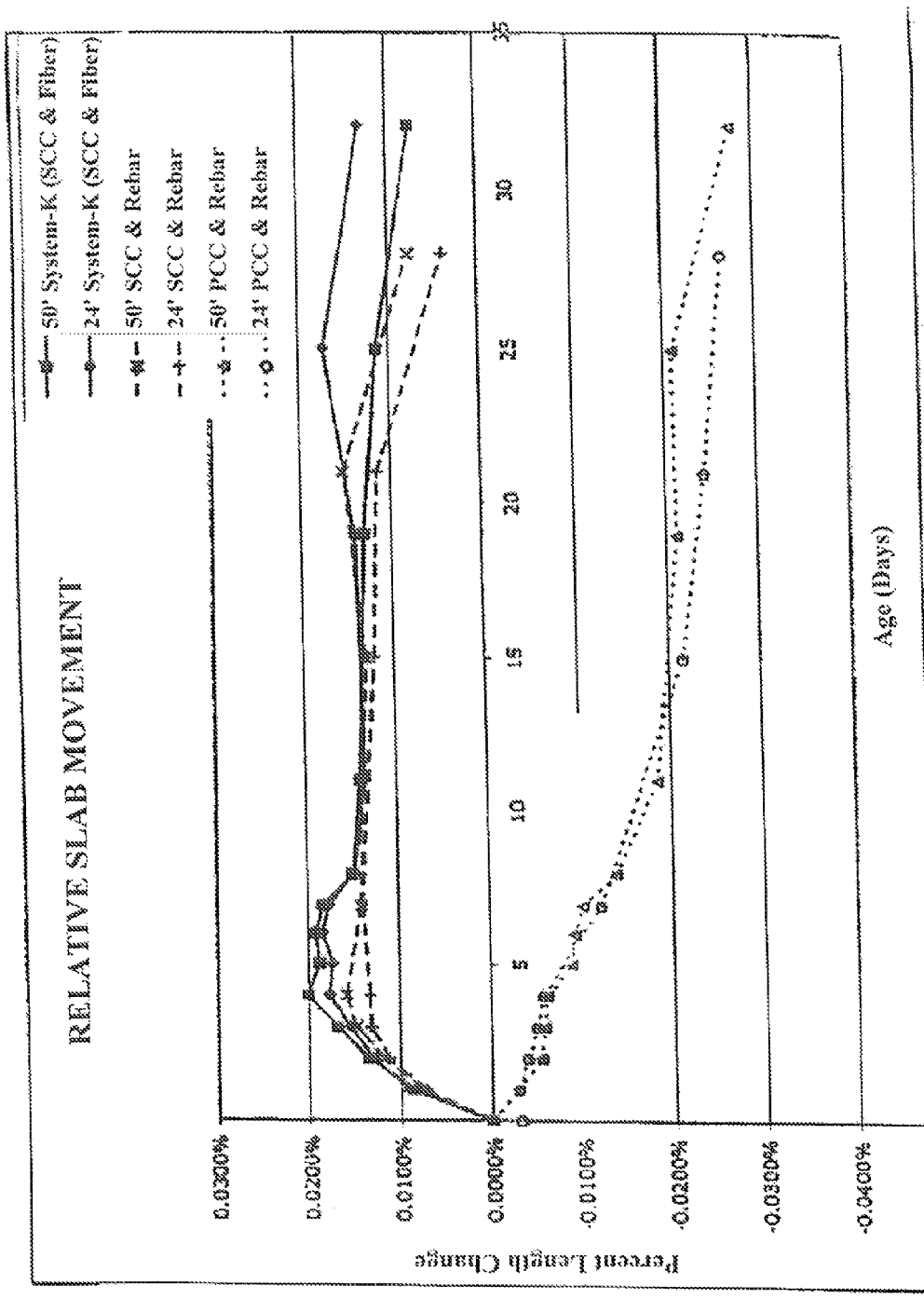
FIG. 3 is a graph showing relative slab movement in field testing, as described in Example II below.

In order to confirm the results of laboratory testing on a larger scale, a field test was carried out in which slabs were placed on compacted fill. The slabs were 6 inches thick, 50 feet or 24 feet long and 6 feet wide. The concrete mix was the same as that used for the laboratory testing. One pair of slabs used Portland cement and had #4 rebar 24" on center each way. One pair of slabs used shrinkage compensating cement and had #4 rebars 24" on center each way. One pair of slabs simply used polypropylene fibers-reinforced shrinkage compensating concrete and no rebar. The slabs were wet-cured for seven days and allowed to air dry. Dial gauges were placed at both ends of each slab. Readings were taken daily for a week and weekly for a month. FIG. 3 shows the results of this field testing.

The fiber-reinforced concrete performed comparably or better than the slabs with shrinkage compensating cement and rebars. All slabs with shrinkage compensating cement performed better than the Portland cement slabs. The Portland slabs exhibited extensive cracking every 10 to 15 feet, which is typical of shrinkage cracking in Portland cement slabs. Overall, the test data shows that the synthetic fibers furnish the required restraint. Only about 2.2 pounds of synthetic fibers per cubic yard are required to give the same restraint as steel reinforcement of 0.0015 ratio of area steel to area of concrete.

Figure 4:
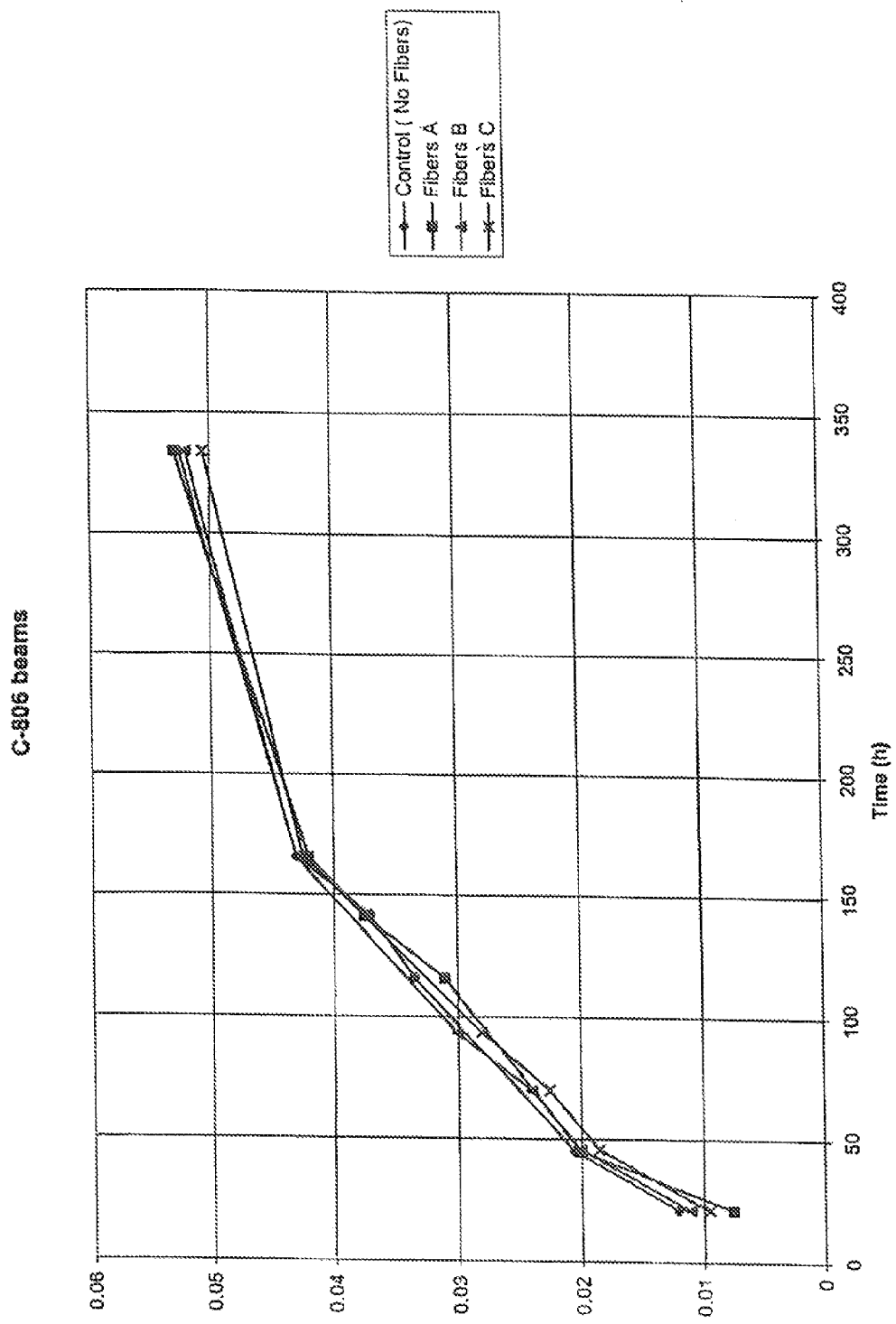
FIG. 4 is a graph showing expansion of C 806 bars with three kinds of fibers, using a fiber dosage of 2.2 lbs/c.y.

Testing indicates that synthetic fibers in the equivalent amount of 2.2 lbs/c.y. do not affect the expansion of mortar bars as measured using the C 806 protocol. As shown in FIG. 4, the expansion of mortars with and without fibers (measured according to ASTM C 806), is similar. Therefore, traditional testing of mortars using a steel rod is not affected by the presence of fibers. This is due to the lower fiber/cement ratio attainable in C 806 mortar mixes, since it is richer in cement than the mix of the C 878 test for concrete. Other mortar testing methods using lower cement content may exhibit restraint, as was observed for C 878 bars.

C 806 tests conducted with the much smaller dosage used in concrete and the C 878 test (about 3.5 grams) showed nearly identical expansion to a sample with no fibers. This indicated that fibers provided essentially no restraint for a mortar testing using the C 806 protocol.

EXAMPLE III

Full Scale Field Test

An additional full scale test was made with the test floor having four 8 inch thick slabs, and two 6 inch thick slabs, constructed with 1725 cubic yards of concrete and fibers as described above. Each slab was about 110 feet by 130 feet. No conventional shrinkage saw cuts or steel reinforcing were used. The concrete was finished with a conventional automated laser screed machine, resulting in an exceptionally flat floor (FF=99.8) at the time of construction. The machine was able to screed the concrete quickly and efficiently because there was no rebar to impede the work.

Three modified ASTM expansion bars were made on each of the six concrete placement days, for a total of 18 bars, utilizing the fibers in the mix to provide restraint against expansion. At 7 days of moist curing, the average expansion was 0.045% (range 0.031% to 0.052%), after which the bars were removed from the moist cure. After 21 days of air drying, the average expansion was 0.007% (range −0.007% to 0.027%). These expansions are similar to those expected from a concrete mix using conventional 878 bars with a steel restraining rod.

Standard 6 inch by 12 inch compressive test cylinders were made. The average 7 day strength was 2453 PSI (range 1967 PSI to 2970 PSI), and the average 28 day strength was 4377 PSI (range 4020 PSI to 4764 PSI).

A detailed inspection of the slab 8 weeks after, placement showed the slab to be crack free. A secondary floor flatness test was also conducted and showed no appreciable change in floor flatness (FF=98.6), and therefore, virtually no detectable slab curling.

Thus, a novel shrinkage compensating concrete has been shown and described. Various changes and substitutions may of course be made without departing from the spirit and scope of the invention. The invention, therefore, should not be limited, except to the following claims and their equivalents.

The invention claimed is:

1. A concrete comprising:
   an expansive cement, aggregate, water and non-metallic fibers forming a shrinkage compensating concrete, with no steel reinforcement in the concrete;
   the non-metallic fibers comprising polypropylene, polyvinyl alcohol, nylon, basalt, or glass fibers, and each cubic yard of shrinkage compensating concrete including 1-10 pounds of the non-metallic fibers;
   with the expansive cement inducing compressive forces in the concrete as the concrete cures; and
   the non-metallic fibers in the concrete restraining the expansion of the concrete without the concrete bonding to the fibers during curing of the concrete, resulting in a reduction or avoidance of cracking of the concrete.

2. The concrete of claim 1 with the non-metallic fibers providing restraint of expansion of the concrete equal to or exceeding the restraint provided by steel as measured by ASTM 878.

3. The concrete of claim 1 wherein the fibers have a density between about 0.8 and 3.0 gm/cm$^3$.

4. The concrete of claim 1 wherein the fibers provide an amount of restraint of expansion equal to or exceeding the restraint provided by steel with a cross-sectional area ratio of the steel to the concrete of about 0.0014.

5. The concrete of claim 1 wherein the fibers restrain the concrete to an average expansion of up to about 0.045%.

6. The concrete of claim 1 wherein the non-metallic fibers comprise fibers having an average diameter of from 0.001 to 0.3 mm and an average length of about 1 to 40 mm.

7. The concrete of claim 1 with the fibers having a modulus of elasticity of about from $0.05 \times 10^6$ to about $1 \times 10^6$ psi.

8. The concrete of claim 1 with the expansive cement comprising a fast setting cement.

9. An expansive concrete comprising:
   an expansive cement, aggregate, water and non-metallic fibers forming an expansive concrete containing substantially no steel reinforcement, with the non-metallic fibers comprising polypropylene, polyvinyl alcohol, nylon, basalt, or glass fibers, and
   with the weight of the non-metallic fibers in the expansive concrete equal to 1-10% of the weight of steel fibers needed to provide equivalent restraint;
   with the expansive cement inducing compressive forces in the concrete as the concrete cures; and
   the non-metallic fibers in the concrete restraining the expansion of the concrete without substantial bonding of the concrete to the fibers during curing of the concrete.

* * * * *